Oct. 4, 1955    L. R. SPANN ET AL    2,719,613
BRAKE SLACK ADJUSTERS FOR RAILWAY CARS
Filed Nov. 18, 1952    3 Sheets-Sheet 1
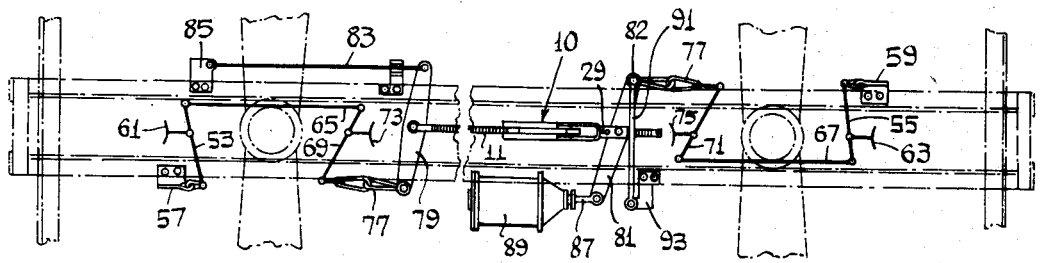
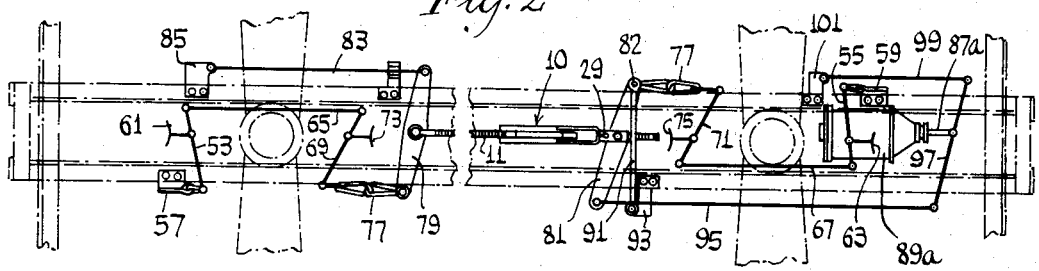
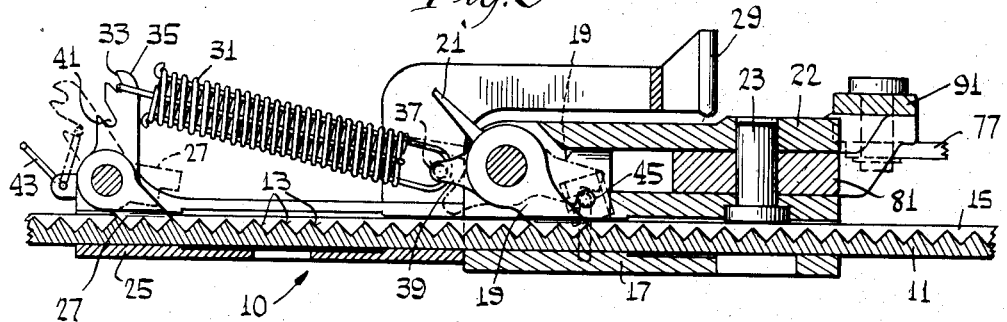
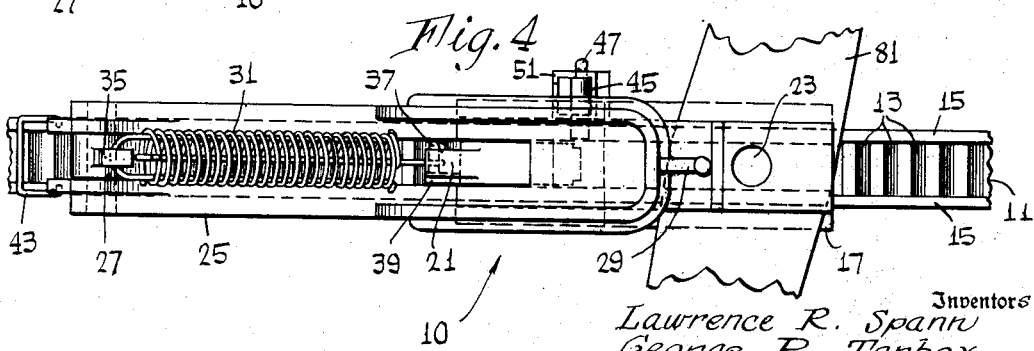
Inventors
Lawrence R. Spann
George R. Tarbox
By Johnson and Kline
Attorneys Oct. 4, 1955  L. R. SPANN ET AL  2,719,613
BRAKE SLACK ADJUSTERS FOR RAILWAY CARS
Filed Nov. 18, 1952  3 Sheets-Sheet 2
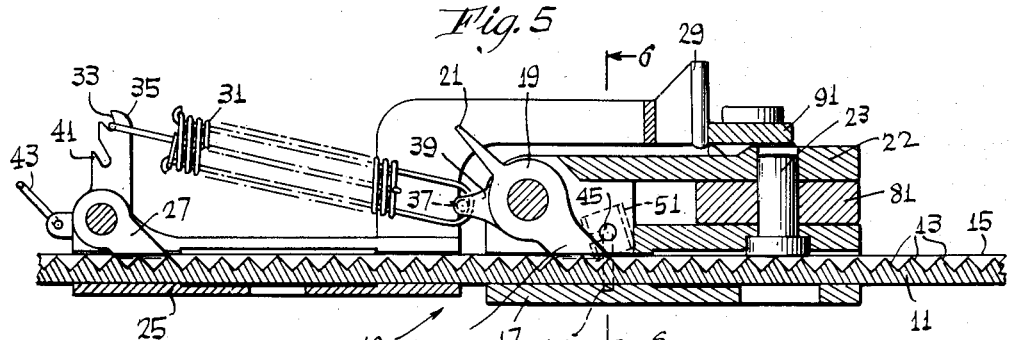
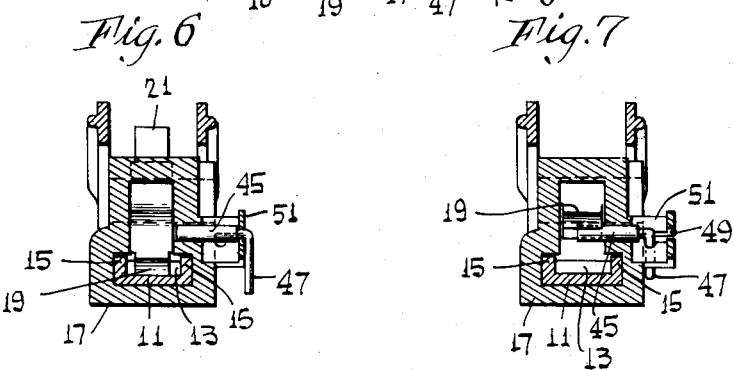
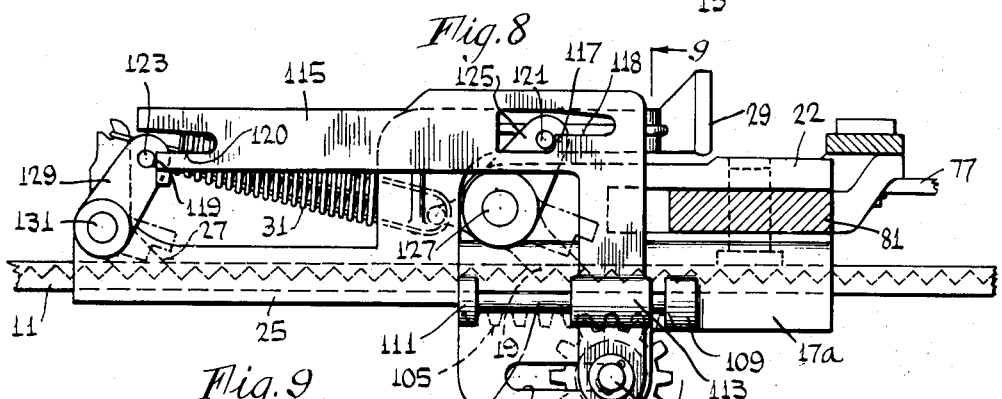
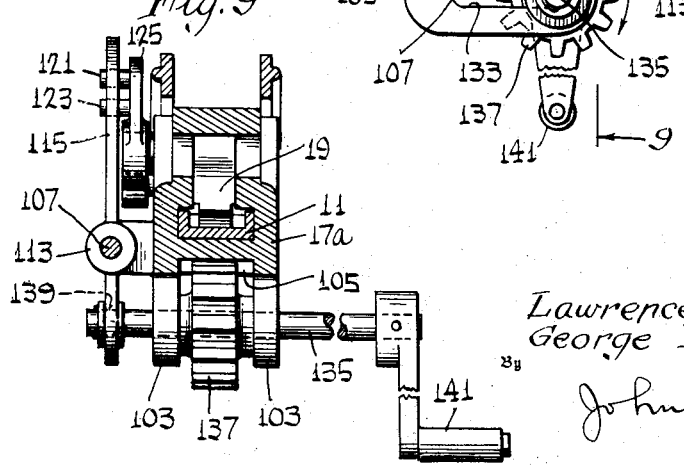
Inventors
Lawrence R. Spann
George R. Tarbox
By
Johnson and Kline
Attorneys Oct. 4, 1955   L. R. SPANN ET AL   2,719,613
BRAKE SLACK ADJUSTERS FOR RAILWAY CARS
Filed Nov. 18, 1952   3 Sheets-Sheet 3
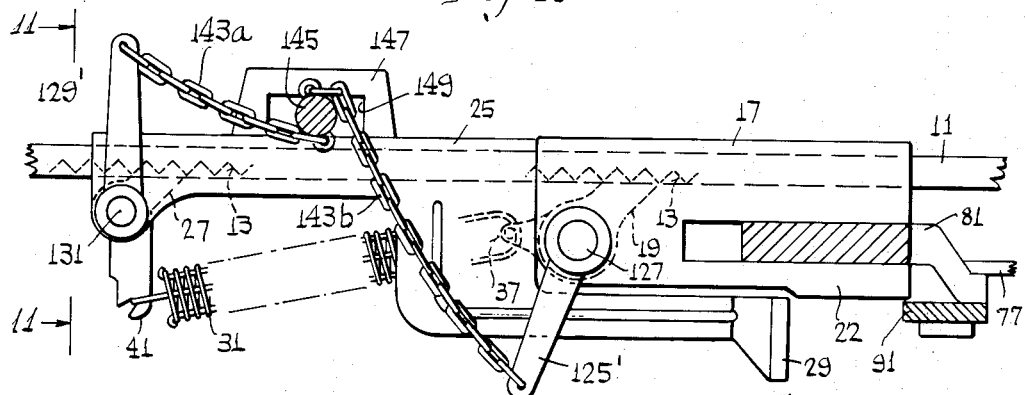
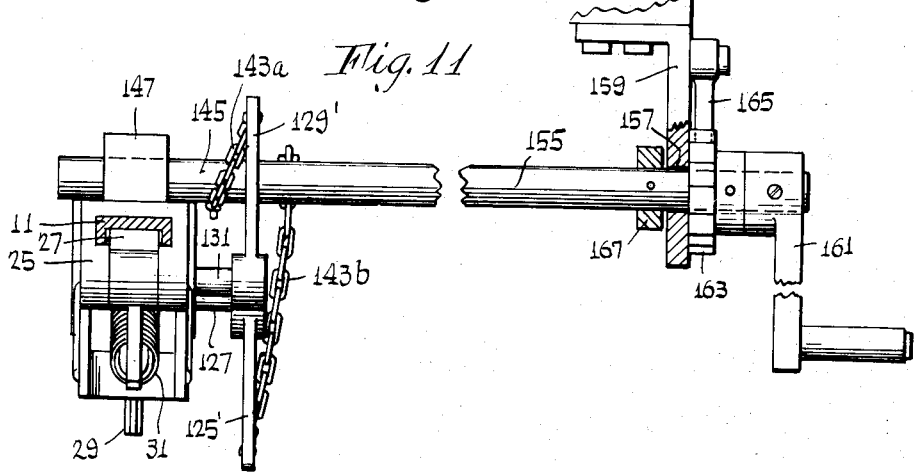
INVENTORS
*Lawrence R. Spann*
*George R. Tarbox*
BY
*Johnson and Kline*
ATTORNEYS

United States Patent Office 2,719,613
Patented Oct. 4, 1955

2,719,613

BRAKE SLACK ADJUSTERS FOR RAILWAY CARS

Lawrence R. Spann, Naugatuck, and George R. Tarbox, Cheshire, Conn., assignors to Eastern Malleable Iron Company, Naugatuck Conn., a company of Connecticut Application November 18, 1952, Serial No. 321,084

19 Claims. (Cl. 188—200)

The present invention relates to improvements in slack adjusters for the brake rigging of railway rolling stock and more particularly to slack adjusters in which excess slack due to wear of the brake shoes is taken up to provide for substantially constant travel of the piston of the air brake cylinder actuating the brakes.

When railway rolling stock, such as a freight car, for example, is initially placed in service, the piston of the air brake cylinder actuating the brake shoes has a predetermined normal travel, in most cases on the order of 7 to 9 inches. These brake shoes wear down in use and eventually more than the normal travel of the air brake piston is required to move the brake shoes against the car wheels to apply a braking force. As a consequence, adjustments have to be made in the brake rigging from time to time in order that the normal and desirable amount of travel of the piston is capable of applying the brakes.

When the brake shoes eventually wear down to such an extent that no further adjustments are possible and new brake shoes are required, provision must be made to retract the brake shoes and the beams sufficiently from the wheel of the railway car to permit such replacement to be made in addition to providing the proper slack in the rigging.

Heretofore, freight car slack adjusters have been provided with a toothed take-up rod which could be manually pulled in one direction to apply the brakes and move the piston to battery position if not already there. When the take-up rod was released and the weight of the brake beams falling away from the wheels moved it in the reverse direction, a measuring mechanism engaged the teeth of the take-up rod and limited the reverse movement of the brake rigging and of the shoes away from the car wheels to thereby provide predetermined slack and clearance between the shoes and the wheels.

Heretofore various types of slack adjusters have been known but of the types available, only the foregoing manually operated adjusters have been generally employed as having sufficient reliability and sturdiness for railway use, and being arrangeable in the brake rigging in a manner such that adjustment of the rigging on an entire car could be accomplished by one adjuster of simple construction, thus coming within restrictions imposed by the economy of freight car operations.

Automatic slack adjusters for maintaining a substantially constant stroke of the brake piston have been used heretofore, but these have been uniformly complex structures designed mainly for passenger car use, or of a nature that required installation of several devices per car for effective operation, or both.

It is an object of the present invention to provide a slack adjuster of novel, improved construction and especially one capable of providing automatic slack adjustment and substantially constant piston travel but which is at the same time able to supply the features of ruggedness, and economy which are essential to its adoption for railway freight car use.

It is another object of the invention to construct an automatic slack adjuster capable of being adapted to the brake rigging of railroad cars presently in use without making important changes in the rigging.

A feature of the present invention is the construction of an automatic slack adjuster comprising essentially two movable sleeves slidable in one direction on a bar element movable longitudinally when the brakes are applied and released, and automatic means, conveniently a spring, connecting the sleeves for urging them into a predetermined relative position, together with stop means for engaging one of the sleeves and shifting it out of said relative position against the force of the urging means after a certain degree of piston travel of the brake operating piston in the brake-applying direction has been achieved.

This arrangement provides a structure which is automatically resettable for substantially constant slack whether or not the brake rigging is fully returned to its full off or battery position after the pressure is released on the brake applying piston.

Preferably the sleeves are connected to the rod for one-way motion therealong by pawls, and another feature of the invention is the provision of means for readily releasing the pawls to permit retrograde motion of the sleeves when the brake rigging must be relaxed for the installation of new brake shoes.

Still another feature of the invention is an arrangement whereby the urging means which maintains the relative position of the sleeves is also made to serve as the urging means for one or both pawls, thus greatly reducing the cost of the device.

Other features and advantages will hereinafter appear.

In the accompanying drawings:

Figure 1 is a diagrammatic plan of the slack adjuster of the present invention as applied to the brake rigging of a railway freight car of the box type.

Fig. 2 is a diagrammatic plan similar to Fig. 1 but illustrating the slack adjuster of the present invention as applied to the brake rigging of a railway freight car of the hopper type.

Fig. 3 is a sectional elevation of the slack adjuster of Figs. 1 and 2, drawn to a larger scale and including a portion of the rigging and measuring arm, the release positions of the dogs being shown in broken lines.

Fig. 4 is a plan of the device shown in Fig. 3 with the measuring arm omitted.

Fig. 5 is a view similar to Fig. 3 but illustrating the relative relationship of the parts during operation of the measuring arm.

Fig. 6 is a section taken on line 6—6 of Fig. 5 and illustrating the parts in normal position.

Fig. 7 is a view similar to Fig. 6 but illustrating the dog-retaining pin in dog-retaining position.

Fig. 8 is a side elevation taken in the same direction as Fig. 3, but with the operating lever and measuring arm shown in section, and illustrating an embodiment of the invention provided with remote control means for the dogs to facilitate brake shoe replacement, the release position of the dogs being shown in broken lines.

Fig. 9 is a section taken on line 9—9 of Fig. 8.

Fig. 10 is an elevation of an automatic slack adjuster according to the invention showing the operating lever and measuring arm in section, and both illustrating the use of the parts in inverted position and showing another embodiment of the dog release mechanism.

Fig. 11 is a section taken on line 11—11 of Fig. 10 and showing the bracket and cooperating collar broken away.

Referring now to the drawings in which a preferred embodiment of the invention is shown, the slack adjuster of the present invention comprises primarily a tension link assembly 10 of adjustable length. The link assembly comprises a bar 11 having on its upper surface a series of teeth 13 which constitute a rack, and provided at either side with a dog guide 15 which also serves as a connector pin stop as will hereinafter appear.

The bar 11 is slidable in a connector sleeve 17 which makes up the remainder of the extensible link 10. The sleeve 17 carries a pivoted dog 19 engageable with the teeth 13 on the rack 11 and having a releasing handle 21. The dog 19 provides for movement of the bar 11 with the sleeve 17 when the latter is moved to the right in Fig. 3. Relative movement of the bar and sleeve in the opposite direction is free with the dog 19 ratcheting over the teeth 13. Also on the sleeve 17, there is provided means including a clevis 22 and a pin 23 for making connection with one of the brake operating levers of the railway car. In the preferred form of the invention illustrated in the drawing, the pin 23 is headed and arranged to be inserted into the clevis from one direction only. The direction of insertion is such that the pin traverses the sleeve opening and hence crosses the path of the rack 11. Thus when the rack 11 is positioned within the sleeve 17, its sides 15 engage the head of the pin 23 and serve to retain the same in place on the sleeve.

A regulating sleeve 25 is also slidable on the bar 11 and normally abuts a portion of the sleeve 17. The regulating sleeve is positioned to that side of the portion so abutted as to lie in the direction therefrom towards which the sleeve 17 may freely move on the bar 19. The regulating sleeve 25 also carries a pivoted dog 27 arranged to engage the teeth 13 of the rack 11 in the same direction as those of the dog 19. An extension of the sleeve 25 is formed to provide a feeler 29 for engagement with a positioning arm to be hereinafter described.

A spring assembly 31 engages in a notch 33 in operating arm 35 of the dog 27 at one end and against a pin 37 on an arm 39 of the dog 19 at the other, and exerts a force on each in a direction to urge the corresponding dog towards engagement with the teeth 13 of the rack 11. At the same time the spring assembly 31 operates to draw the sleeves 17 and 25 towards each other into normal abutting relationship by acting on them through the dog mountings. The connection of spring 31 with dog 19 is preferably arranged, as seen in Fig. 3 to have its line of action pass fairly near the pivot axis of dog 19. In this manner it is possible to maintain an important light ratcheting action for the pawl even though the spring 31 is so deflected as to exert a large force for restoring the sleeves 17 and 25 to abutting condition.

The dog 27 is arranged to be released from the rack under certain conditions and is provided with a hook 41 engageable with a retaining bail 43 for holding the dog in released position against the force of spring 31 when desired. Likewise, dog 19 has means for holding the same in released position against the force of spring 31. This means takes the form of a sliding bolt 45 having a handle 47 engaging in a slot 49 in bracket 51. In Fig. 6 the bolt 45 is shown in normal inactive position, and in Fig. 7 in dog-retaining position.

The feeler 29 is preferably bifurcated as best seen in Figs. 4, 6 and 7 so as to straddle the spring 31 and the arms 21 and 39 of dog 19, whereby the device may be held to a minimum weight and within a minimum compass.

The slack adjuster is intended to replace or be inserted in, one of the longitudinally movable tension links in the brake rigging and is shown in its preferred location in Figs. 1 and 2. The brake rigging shown, other than the novel slack adjuster, is conventional and includes dead levers 53 and 55, each anchored at one end on the car frame for pivotal movement, as by connectors 57 and 59 respectively. Each dead lever is connected intermediate its ends to a brake beam, the lever 53 to a beam 61 and lever 55 to a beam 63. The free ends of the dead levers 53 and 55 are connected respectively to connecting rods 65 and 67 which are in turn connected respectively to the ends of live levers 69 and 71. The live levers are pivotally connected intermediate their ends to brake beams 73 and 75, and at the other ends are attached by shackles 77 to operating levers 79 and 81 respectively, the latter forming a pivotal connection 82. Operating lever 79 has its other end anchored by a tension link 83 to a suitable pad 85 on the car frame. The link 83 and pad 85 occupy one of the conventional locations for the manually operated slack of adjusters now in use, and replace the same when the adjuster of the present invention is employed. The remaining end of operating lever 81 is connected to the piston rod 87 of the conventional fluid pressure cylinder 89 used to apply the brakes. Intermediate points on the operating levers are connected by the extensible link 10 of the present invention in place of the usual connecting rod. The operating lever 79, for example, is pivotally connected to the end of the bar 11, while the clevis portion 22 of sleeve 17 embraces the operating lever 81 with the pin 23 passing therethrough to form a pivotal connection therewith.

A measuring stop arm 91 is pivotally connected at one end to the pivot 82 of the operating arm 81, and at its other end is pivoted by a suitable anchor 93 to the car frame. The stop arm 91 is arranged at a level so that it will lie in the path of feeler 29 and will be engaged by the same when the conditions are right, as can be seen in Figs. 3 and 5.

As can be seen in Figs. 1 and 3 there is a predetermined distance between the feeler 29 and the stop 91 which distance is related to and represents the optimum piston stroke for brake application. When normal operation is in progress, pressure fluid supplied to the cylinder 89 will cause the piston to move to the right applying the brakes. The tension unit 10 will move to the right an amount sufficient to take up all of the slack at the beams 61, 73 and in the left-hand portion of the linkage, while all of the right-hand portion of the linkage and the beams 63, 75 will have their slack taken up by a motion of the pivot 82 towards the left. Consequently the feeler 29 and the stop arm 91 will move towards each other, and normally will just come into contact when the brakes are fully applied and when the piston connected end of lever 81 is adjacent the frame connected end of measuring arm 91.

However, when wear of the brake shoes increases the slack in the rigging, the relative movement of feeler 29 and stop 91 will become somewhat greater than normal, so that the sleeve 25 is nudged slightly to the left along the bar 11 against the force of spring assembly 31. When the wear becomes sufficient to separate the sleeves 25 and 17 by a distance of one ratchet tooth 13 during brake application, the dog 27 ratchets over one tooth 13 and locks the sleeve 25 in a new position on the bar 11 as seen in Fig. 5. Then, when the force of the brake cylinder is removed and the rigging is allowed to relax, the sleeve 17 is again drawn into abutment with the end of the regulating sleeve 25 by the spring assembly 31 so that its dog 19 also ratchets over one tooth 13, thus automatically shortening the distance between the central connection points of the operating levers 79 and 81 by an amount just sufficient to return the slack in the rigging to the normal value and the cylinder stroke during brake application to the exact optimum. The operation progresses in this fashion, one ratchet tooth at a time until all of the wear has been put on the brake shoes that is permissible, and renewal is called for. It is important to have a strong restoring force between the sleeves 17 and 25 so that normal friction will be completely overcome and the movement of sleeve 17 to its new position will be assured, and spring 31 is designed with this in mind. However, to keep this force from also affecting the resistance offered by dog 19 to the movement of sleeve 17, the connection point of the spring with the dog is specially located as heretofore explained.

In order to expedite renewal of the brake shoes it is desirable to have a ready means for giving a large amount of slack in the rigging. In the present instance, the tension link assembly can be quickly expanded by merely raising the dogs 19 and 27 out of contact with the teeth 13 on bar 11 and sliding both sleeves 17 and 25 to the right along the bar 11. Bail 43 is preferably engaged with hook 41 on the arm 35 of dog 27 to hold the same in disengaged position, while the dog 19 is retracted using arm 21 and so held by manipulating bolt 45 into interfering position, both as seen in broken lines in Fig. 3. The tension link assembly 10 can then be expanded to any desired length and the brake shoes replaced. When the repair is completed, the dogs 19 and 27 are released and again allowed to engage the teeth 13 of bar 11. Thereafter the brakes are applied during which process the proper length for the tension link 10 will be automatically set in the manner previously described except that all of the undesired slack, possibly to the extent of several teeth if necessary will be taken up at the first application of the brakes by suitable ratcheting of the dogs 19 and 27.

Fig. 2 illustrates the rigging arrangement as applied to a freight car of the hopper type. The operation of the automatic slack adjuster is substantially identical with that of the Fig. 1 arrangement, and the brake rigging is identical except that the fluid pressure cylinder 89a is placed at the end of the car and has its force transmitted to the end of operating lever 81 by means of the link 95 and lever 97 which has one end anchored to the frame, e. g. by link 99 and pad 101, the piston rod 87a being connected at an intermediate point on lever 97.

In Figs. 8 and 9 is illustrated another embodiment of the invention provided with means whereby the dog release may be easily effected from a remote position at the side of the car. In most respects the structure shown is identical with that of Figs. 3 to 7, and the same reference characters have been used to indicate the same parts. The difference is that the sleeve 17 has been replaced by a sleeve 17a having depending lugs 103, a short rack 105 on its under side between the lugs, and a guide rod 107 spaced from one side of the sleeve and supported thereon by outwardly extending ears 109 and 111. Slidably mounted on the rod 107 is a sleeve 113 which is integral with and forms the supporting and guiding means for an L-shaped pusher member 115, which rises upwardly from the sleeve 113, turns and extends along beside the upper portions of sleeve 17a and sleeve 25. The pusher member 115 has two pin-operating abutment surfaces 117 and 119 which rest against pins 121 and 123 respectively and two pin locking surfaces 118 and 120 adapted to cooperate with said pins as hereinafter described. The pin 121 forms a part of the actuating lever 125 which is mounted on an extended shaft 127 operatively connected with dog 19. Similarly, the pin 123 forms a part of the actuating lever 129 which is mounted on an extended shaft 131 operatively connected with the dog 27.

The lugs 103 are provided with parallel slots 133 which receive a portion of a shaft 135 extending transversely of the car. Fixed to the shaft 135 between lugs 103 is a gear 137 which meshes with rack 105. One end of the shaft 135 is rotatably engaged in an opening 139 in the lower end of pusher member 115 while the other end is appropriately supported at the side of the car and drivingly connected with an operating crank handle 141.

The operation of the device shown in Figs. 8 and 9 is the same as described for the form shown in Figs. 1 to 7, except that when the brake shoe wear has progressed to a point where replacement is necessary, the relaxing of the rigging is brought about by merely turning the crank 141 in a direction which would be anticlockwise to an operator facing the car side, i. e. clockwise as seen in Fig. 8. This causes the gear 137 to progress leftwardly along rack 105 as seen in Fig. 8, carrying with it the pusher member 115 which slides leftwardly along the rod 107. The abutment surface 117 moves the pin 121 to the left, while the abutment surface 119 simultaneously moves pin 123 to the left, thus raising both of the dogs 19 and 27. This allows the bar 11 to move to the left while the sleeves 17a and 25 are permitted to move to the right, relaxing the rigging and allowing space for conducting the brake shoe replacement work. When the abutments 117 and 119 have moved the pins 121 and 123 sufficiently far to the left as seen in Fig. 8, the pins will be raised to a position where they clear the abutments and further movement of the pusher member 115 will cause no additional movement of the pins. Instead the locking surface 118 will pass beneath the pin 121 to hold the dog 19 out of engagement with the rack 11. Similarly locking surface 120 will hold the dog 27 out of engagement with the rack.

When the brake shoe replacement is complete and it is desired to reengage the dogs 19 and 27 with the rack 11, the crank 141 is rotated in the opposite direction (anticlockwise as seen in Fig. 8) until the dogs are permitted to return to their initial position due to the influence of spring 31.

From the foregoing description it can be seen that the present invention provides an automatic slack adjusting mechanism which operates to maintain the brake applying stroke of the brake piston at the optimum value at all times, but which is of a simple, rugged construction adapting it to economical use in freight car operation. A single mechanism serves to adjust the linkage of each car and is introduced into the rigging by merely substituting the improved adjuster for the central connecting rod or inserting it therein.

While the parts have been described with regard to their positions as shown in Figs. 3 to 9 of the drawings, it will be understood that devices according to the present invention will operate with equal facility in other positions, for example, in a position inverted from that of Figs. 1 to 9 as illustrated in Figs. 10 and 11. These figures also show another embodiment of the release mechanism, at present preferred, in which the dogs are conveniently released by means of a flexible element rather than by the pusher 115 of Figs. 8 and 9. Since the brake adjusting structure is basically the same as that in the other forms, a description of the parts and their operation will not be detailed at this point, it being understood that the same reference characters are used to designate the same parts in this and the preceding embodiments.

The arms 125' and 129' replace the arms 125 and 129 on shafts 127 and 131 of dogs 19 and 27, and arm 129' is positioned at a different angle to the dog, particularly somewhere to the opposite side of a line perpendicular to the arm direction shown, in Fig. 8. The ends of the arms 125' and 129' are connected to the ends of a chain having parts 143a and 143b, which extends between the arms with substantial slack. Connected to the chain substantially midway between its ends or, specifically, joined to the other ends of chain parts 143a, 143b is a drum or core member 145 which can be used to wind up the chain from the middle, thus shortening the distance between its ends. This shortening of the chain draws the ends of arms 125' and 129' closer to each other, thus lifting the dogs 19 and 27 from engagement with the teeth 13 of the rack 11 to permit the brake rigging to be slacked off for shoe replacement. Rotation of the drum 145 in the opposite direction then permits the dogs 19 and 27 to reengage the rack 11. The drum member 145 is preferably supported by a surface of the sleeve 25 which may carry for this purpose a guide plate 147 having a slot 149 in which the drum or some extension thereof is received and providing substantial lateral movement therefor so that the chain may be freely wound, whichever direction this may tend to draw the drum.

To provide for convenient operation of the drum 145, a shaft 155, which is shown merely as an extension of the drum 145, in this case, is extended from the drum to a side of the car and has its end loosely mounted for rotary and slight rocking movement in an opening 157 in a bracket 159. A crank 161 is provided on the end of the shaft for manually rotating the same. In order that the dogs may be held in disengaged position against the force of spring means 31 while the rigging is being slacked off, the shaft 155 is provided with a ratchet wheel 163 adjacent the bracket 159, and a pawl 165 is mounted on the bracket in a position to engage the ratchet and hold the chain in wound condition until it is desired to return the dogs 19 and 27 to rack engaging position. A collar 167 on shaft 155 serves to restrict axial movement of the shaft sufficiently to insure the continued engagement of the ratchet wheel 163 and pawl 165, as well as to prevent release of drum 145 from slot 149 in guide plate 147.

Variations and modifications may be made within the scope of the claims and portions of the improvements may be used without others.

We claim:

1. In a railway car having a frame, a brake system for each truck, an operating lever for each system and connected thereto at one of its ends, a main connecting rod means connected at its ends to intermediate portions of said operating levers and power operating means connected to one end of one of said operating levers for operating both brake systems, the improvement which comprises: said connecting rod means being constituted by an assembly including a bar having one end connected with the operating lever which is not directly power connected, a drive sleeve connected with the power operated lever, slidable on the bar and having a one-way driving connection therewith in a direction towards said power operated lever, and a regulating sleeve slidable on said bar and having a one-way driving connection therewith in the same direction; a measuring arm substantially equal in length to said power operated lever, pivotally connected at one end to the system-connected end of said power operated lever and pivotally connected at the other to said frame at a point near the position occupied by the power-connected end of said lever when the latter is in its prescribed brake-applied position; and means on said regulating sleeve for abutting an intermediate portion of said measuring arm and sliding said regulating sleeve to a new position on said bar when more than a prescribed lever movement is required to apply the brakes.

2. In a railway car having a frame, a brake system for each truck, an operating lever for each system and connected thereto at one of its ends, a main connecting rod means connected at its ends to intermediate portions of said operating levers and power operating means connected to one end of one of said operating levers for operating both brake systems, the improvement which comprises: said connecting rod means being constituted by an assembly including a bar having one end connected with the operating lever which is not directly power connected, a drive sleeve connected with the power operated lever, slidable on the bar and having a one-way driving connection therewith in a direction towards said power operated lever, a regulating sleeve slidable on said bar and having a one-way driving connection therewith in the same direction, said sleeves having surfaces normally in abutment, and spring means carried by the sleeves for urging said surfaces into abutment; a measuring arm substantially equal in length to said power operated lever, pivotally connected at one end to the system-connected end of said power operated lever and pivotally connected at the other to said frame at a point near the position occupied by the power-connected end of said lever when the latter is in its prescribed brake-applied position; and means on said regulating sleeve for abutting an intermediate portion of said measuring arm and sliding said regulating sleeve on said bar to separate said abutting surfaces when more than a prescribed lever movement is required to apply the brakes.

3. In a railway car having a frame, a brake system for each truck, an operating lever for each system and connected thereto at one of its ends, a main connecting rod means connected at its ends to intermediate portions of said operating levers and power operating means connected to one end of one of said operating levers for operating both brake systems, the improvement which comprises: said connecting rod means being constituted by an assembly including a bar having one end connected with the operating lever which is not directly power connected, a drive sleeve connected with the power operated lever, slidable on the bar and having a one-way driving connection therewith in a direction towards said power operated lever, a regulating sleeve slidable on said bar and having a one-way driving connection therewith in the same direction, said sleeves having surfaces normally in abutment, and spring tension means carried by the sleeves and interconnecting the same for drawing said sleeves together with said surfaces in abutment; a measuring arm substantially equal in length to said power operated lever, pivotally connected at one end to the system-connected end of said power operated lever and pivotally connected at the other to said frame at a point near the position occupied by the piston-connected end of said lever when the latter is in its prescribed brake-applied position; and means on said regulating sleeve for abutting an intermediate portion of said measuring arm and sliding said regulating sleeve on said bar to separate said abutting surfaces when more than the prescribed lever movement is required to apply the brakes.

4. In a device for automatically adjusting the slack in the brake rigging of a railway car having a reciprocating brake applier, a tension bar movable longitudinally in one direction during brake application; a driving sleeve slidable on said bar; means providing a one-way drive connection between said bar and sleeve such that the sleeve drives the bar in said one direction and moves freely thereon in the other; a regulating sleeve slidable on said bar; means providing a one-way drive connection between said bar and said regulating sleeve operating in the same direction as said driving sleeve connection, said regulating sleeve being at that side of said driving sleeve towards which it is freely movable along the bar; yielding means connecting said sleeves for urging them towards and into abutment with each other and connected to, and actuating, said one-way driving connection between the bar and the driving sleeve; and means carried by the railway car for engaging the regulating sleeve and arresting movement of said regulating sleeve in said one direction after a predetermined travel of said brake applier.

5. In a device for automatically adjusting the slack in the brake rigging of a railway car having a reciprocating brake applier, a rack bar movable longitudinally in one direction during brake application; a driving sleeve slidable on said bar; a dog pivoted on said sleeve and providing a one-way connection between said rack bar and sleeve such that the sleeve drives the bar in said one direction and moves freely thereon in the other; a regulating sleeeve slidable on the bar; a dog pivoted on said regulating sleeve providing a one-way connection between said bar and said regulating sleeve operating in the same direction as said driving sleeve connection, said regulating sleeve being at that side of said driving sleeve towards which it is freely movable along the bar; yielding means connecting said dogs for urging said sleeves towards each other and for simultaneously urging said dogs into engagement with said rack bar; and means carried by the vehicle for engaging the regulating sleeve and arresting movement of said regulating sleeve in said one direction after a predetermined travel of said brake applier.

6. In a device for automatically adjusting the slack in the brake rigging of a railway car having a reciprocating brake applier, a rack bar movable longitudinally in one direction during brake application; a driving sleeve slidable on said bar; a dog pivoted on said sleeve and providing a one-way connection between said rack bar and sleeve such that the sleeve drives the bar in said one direction and moves freely thereon in the other; a regulating sleeve slidable on the bar; a dog pivoted on said regulating sleeve providing a one-way connection between said bar and said regulating sleeve operating in the same direction as said driving sleeve connections, said regulating sleeve being at that side of said driving sleeve towards which it is freely movable along the bar; yielding means connecting said dogs for urging said sleeves towards each other and for simultaneously urging said dogs into engagement with said rack bar; and means carried by the vehicle for engaging the regulating sleeve and arresting movement of said regulating sleeve in said one direction after a predetermined travel of said brake applier, the line of action of said yielding means passing closely adjacent the pivot axis of the drive sleeve dog to minimize the frictional resistance of the latter to sliding of the rack bar.

7. In a device for automatically adjusting the slack in the brake rigging of a railway car having brake operating lever moved by a reciprocating brake applier, a tension bar movable longitudinally in one direction during brake application; a driving sleeve slidable on said bar and having a passage therethrough receiving the same; means providing a one-way drive connection between said bar and sleeve such that the sleeve drives the bar in said one direction; a regulating sleeve slidable on said bar; means providing a one-way sliding connection between said bar and said regulating sleeve operating in the same direction as said driving sleeve connection, said regulating sleeve being at that side of said driving sleeve towards which it is freely movable along the bar; automatic means connecting said sleeves for urging them towards each other; a feeler on the regulating sleeve; means carried by the vehicle for engaging the feeler and arresting movement of said regulating sleeve in said one direction after a predetermined travel of said brake applier, said driving sleeve including a clevis having arms with pin receiving openings therein; and a pin in said openings connecting the driving sleeve to said operating lever, said opening being aligned wtih the sleeve passage receiving said tension bar and said pin having means whereby when said tension bar is in place withdrawal of said pin from said openings is prevented.

8. In a device for automatically adjusting the slack in the brake rigging of a railway car having a reciprocating brake applier, a tension bar movable longitudinally in one direction during brake application; a driving sleeve slidable on said bar; means providing a one-way drive connection between said bar and sleeve such that the sleeve drives the bar in said one direction and moves freely thereon in the other; a regulating sleeve slidable on said bar; means providing a one-way drive connection between said bar and said regulating sleeve operating in the same direction as said driving sleeve connection; automatic means connecting said sleeves for urging them towards and into abutment with each other; means carried by the railway car for engaging the regulating sleeve and arresting movement of said regulating sleeve in said one direction after a predetermined travel of said brake applier; and means provided with a single manual control element for disengaging both of said one-way drive connection means to permit free sliding of the tension bar in both of said sleeves for relaxing of the brake rigging.

9. In a device for automatically adjusting the slack in the brake rigging of a railway car having a reciprocating brake applier, a rack bar movable longitudinally in one direction during brake application; a driving sleeve slidable on said bar; a dog pivoted on said sleeve and providing a one-way connection between said rack bar and sleeve such that the sleeve drives the bar in said one direction and moves freely thereon in the other; a regulating sleeve slidable on the bar; a dog pivoted on said regulating sleeve providing a one-way connection between said bar and said regulating sleeve operating in the same direction as said driving sleeve connection, said regulating sleeve being at that side of said driving sleeve towards which it is freely movable along the bar; yielding means connecting said dogs for urging said sleeves towards each other and for simultaneously urging said dogs into engagement with said rack bar; means carried by the vehicle for engaging the regulating sleeve and arresting movement of said regulating sleeve in said one direction after a predetermined travel of said brake applier; an operating arm carried by each of said dogs; and a single pusher member movable on one of said sleeves and engageable with both of said arms for disengaging both of said dogs from the rack bar in opposition to the force of said yielding means when it is desired to relax the brake rigging.

10. In a device for automatically adjusting the slack in the brake rigging of a railway car having a reciprocating brake applier, a rack bar movable longitudinally in one direction during brake application; a driving sleeve slidable on said bar; a dog pivoted on said sleeve and providing a one-way connection between said rack bar and sleeve such that the sleeve drives the bar in said one direction and moves freely thereon in the other; a regulating sleeve slidable on the bar; a dog pivoted on said regulating sleeve providing a one-way connection between said bar and said regulating sleeve operating in the same direction as said driving sleeve connection, said regulating sleeve being at that side of said driving sleeve towards which it is freely movable along the bar; yielding means connecting said dogs for urging said sleeves towards each other and for simultaneously urging said dogs into engagement with said rack bar; means carried by the vehicle for engaging the regulating sleeve and arresting movement of said regulating sleeve in said one direction after a predetermined travel of said brake applier; an operating arm carried by each of said dogs; a pin on each of said arms; a single pusher member movable on one of said sleeves and having pushing surfaces engageable with said pins for disengaging both of said dogs from the rack bar in opposition to the force of said yielding means, said pusher member also having pin retaining surfaces adjacent and at an angle to said pushing surfaces for automatically underlying each of said pins after predetermined swinging thereof about the axes of the dog pivots, and thus preventing the return of the dogs to engaged position with said rack under the force of said yielding means and without exerting any restoring force on said pusher.

11. In a device for automatically adjusting the slack in the brake rigging of a railway car having a reciprocating brake applier, a rack bar movable longitudinally in one direction during brake application; a driving sleeve slidable on said bar; a dog pivoted on said sleeve and providing a one-way connection between said rack bar and sleeve such that the sleeve drives the bar in said one direction and moves freely thereon in the other; a regulating sleeve slidable on the bar; a dog pivoted on said regulating sleeve providing a one-way connection between said bar and said regulating sleeve operating in the same direction as said driving sleeve connection, said regulating sleeve being at that side of said driving sleeve towards which it is freely movable along the bar; yielding means connecting said dogs for urging said sleeves towards each other and for simultaneously urging said dogs into engagement with said rack bar; means carried by the vehicle for engaging the regulating sleeve and arresting movement of said regulating sleeve in said one direction after a predetermined travel of said brake applier; an operating arm carried by each of said dogs; a single pusher member movable on said driving sleeve and engageable with both of said arms for releasing both of said dogs from the rack bar in opposition to the force of said yielding means; toothed driving means on said pusher member and driving sleeve for causing relative movement therebetween; and manual control means extending to a readily accessible position at the side of a railway car upon which the device is mounted for operating the toothed driving means and thereby relaxing the brake rigging when desired.

12. In a railway car having a frame, a brake system for each truck, an operating lever for each system and connected thereto at one of its ends, a main connecting rod means connected at its end to intermdeiate portions of said operating levers and power operating means connected to one end of one of said operating levers for operating both brake systems, the improvement which comprises: said connecting rod means being constituted by an assembly including a bar having one end connected with the operating lever which is not directly power connected, a drive sleeve connected with the power operated lever, slidable on the bar and having a one-way driving connection therewith in a direction towards said power operated lever, a regulating sleeve slidable on said bar and having a one-way driving connection therewith in the same direction, said sleeves having surfaces normally in abutment, and automatic means carried by the sleeves for urging said surfaces into abutment; a measuring arm substantially equal in length to said power operated lever, pivotally connected at one end to said car frame and so connected to the other end of said power operated lever as to move therewith an amount measuring the take-up in the system associated directly with said power operated lever; and means on said regulating sleeve for abutting an intermediate portion of said measuring arm substantially in line with said bar and sliding said regulating sleeve on said bar to separate said abutting surfaces when more than a prescribed lever movement is required to apply the brakes.

13. In a device for automatically adjusting the slack in the brake rigging of a railway car having a reciprocating brake applier, a tension bar movable longitudinally in one direction during brake application; a driving sleeve slidable on said bar; means providing a one-way drive connection between said bar and sleeve such that the sleeve drives the bar in said one direction and moves freely thereon in the other; a regulating sleeve slidable on said bar; means providing a one-way drive connection between said bar and said regulating sleeve operating in the same direction as said driving sleeve connection, said regulating sleeve being at that side of said driving sleeve towards which it is freely movable along the bar; automatic means connecting said sleeves for urging them towards and into abutment with each other, and measuring means connected with and movable coordinately with the brake applier for engaging the regulating sleeve and arresting movement of said regulating sleeve in said one direction after a predetermined travel of said brake applier.

14. In a device for automatically adjusting the slack in the brake rigging of a railway car having a reciprocating brake applier, a rack bar movable longitudinally in one direction during brake application; a driving sleeve slidable on said bar; a dog pivoted on said sleeve and urged into engagement with said rack bar for providing a one-way drive connection between said bar and sleeve such that the sleeve drives the bar in said one direction and moves freely thereon in the other; a regulating sleeve slidable on said bar; a dog pivoted on said regulating sleeve and urged into engagement with said rack bar for providing a one-way drive connection between said bar and said regulating sleeve operating in the same direction as said driving sleeve connection, said regulating sleeve being at that side of said driving sleeve towards which it is freely movable along the bar; automatic means connecting said sleeves for urging them towards and into abutment with each other and connected to said dog on the driving sleeve to urge said dog into engagement with said rack bar; and means carried by the railway car for engaging the regulating sleeve and arresting movement of said regulating sleeve in said one direction after a predetermined travel of said brake applier.

15. In a device for automatically adjusting the slack in the brake rigging of a railway car having a reciprocating brake applier, a rack bar movable longitudinally in one direction during brake application; a driving sleeve slidable on said bar; a dog pivoted on said sleeve and urged into engagement with said rack bar for providing a one-way drive connection between said bar and sleeve such that the sleeve drives the bar in said one direction and moves freely thereon in the other; a regulating sleeve slidable on said bar; a dog pivoted on said regulating sleeve and urged into engagement with said rack bar for providing a one-way drive connection between said bar and said regulating sleeve operating in the same direction as said driving sleeve connection, said regulating sleeve being at that side of said driving sleeve towards which it is freely movable along the bar; automatic means connecting said sleeves for urging them towards and into abutment with each other; means carried by the railway car for engaging the regulating sleeve and arresting movement of said regulating sleeve in said one direction after a predetermined travel of said brake applier; and means having a manual control element for disengaging both of said dogs at the same time from said rack bar to permit free sliding of the bar in both of said sleeves for relaxing of the brake rigging.

16. In a device for automatically adjusting the slack in the brake rigging of a railway car having a reciprocating brake applier, a rack bar movable longitudinally in one direction during brake application; a driving sleeve slidable on said bar; a dog pivoted on said sleeve and urged into engagement with said rack bar for providing a one-way drive connection between said bar and sleeve such that the sleeve drives the bar in said one direction and moves freely thereon in the other; a regulating sleeve slidable on said bar; a dog pivoted on said regulating sleeve and urged into engagement with said rack bar for providing a one-way drive connection between said bar and said regulating sleeve operating in the same direction as said driving sleeve connection, said regulating sleeve being at that side of said driving sleeve towards which it is freely movable along the bar; automatic means connecting said sleeves for urging them towards and into abutment with each other; means carried by the railway car for engaging the regulating sleeve and arresting movement of said regulating sleeve in said one direction after a predetermined travel of said brake applier; an operating arm carried by each of said dogs; a flexible release element connected between said operating arms; a drum connected to said flexible element and rotatable to wind the flexible element about its surface to draw the ends closer together and release both dogs from the rack bar; and manual control means located at the side of the car and connected with said drum for operating the same.

17. In a device for automatically adjusting the slack in the brake rigging of a railway car having a reciprocating brake applier, a rack bar movable longitudinally in one direction during brake application; a driving sleeve slidable on said bar; a dog pivoted on said sleeve and providing a one-way connection between said rack bar and sleeve such that the sleeve drives the bar in said one direction and moves freely thereon in the other; a regulating sleeve slidable on the bar; a dog pivoted on said regulating sleeve providing a one-way connection between said bar and said regulating sleeve operating in the same direction as said driving sleeve connection, said regulating sleeve being at that side of said driving sleeve towards which it is freely movable along the bar; a spring connecting said dogs for urging said sleeves towards each other and for simultaneously urging said dogs into engagement with said rack bar; an operating arm carried by each of said dogs; a flexible release element connected between said operating arms; a drum connected to said flexible element and rotatable to wind the flexible element about its surface to draw the ends closer together and release both dogs from the rack bar; and manual control means located at the side of the car and connected with said drum for operating the same.

18. In a device for automatically adjusting the slack in the brake rigging of a railway car having a reciprocating brake applier, a tension bar movable longitudinally in one direction during brake application; a driving sleeve slidable on said bar; means providing a one-way drive connection between said bar and sleeve such that the sleeve drives the bar in said one direction and moves freely thereon in the other; means for automatically adjusting the position of said driving sleeve on said bar to set the required amount of slack present in the brake rigging and compensate for brake shoe wear; means for connecting said driving sleeve to a portion of the brake rigging including a pin passing through portions of said sleeve; and means for preventing withdrawal of said pin including said tension bar, the latter being arranged to prevent pin removal or insertion when the bar is operatively positioned in said sleeve, and to permit pin insertion or removal when withdrawn from said sleeve.

19. In a device for automatically adjusting the slack in the brake rigging of a railway car having a reciprocating brake applier, a tension bar movable longitudinally in one direction during brake application; a driving sleeve slidable on said bar; means providing a one-way drive connection between said bar and sleeve such that the sleeve drives the bar in said one direction and moves freely thereon in the other; a regulating sleeve slidable on said bar; means providing a one-way drive connection between said bar and said regulating sleeve operating in the same direction as said driving sleeve connection; automatic means connecting said sleeves for urging them towards and into abutment with each other; means carried by the railway car for engaging the regulating sleeve and arresting movement of said regulating sleeve in said one direction after a predetermined travel of said brake applier; and means provided with a single manual control element for disengaging both of said one-way drive connection means to permit free sliding of the tension bar in both of said sleeves for relaxing of the brake rigging and including means for positively pulling said sleeves together and holding them together.

References Cited in the file of this patent

UNITED STATES PATENTS

| 887,637 | Hibbard | May 12, 1908 |
| 2,559,779 | Martin | July 10, 1951 |

FOREIGN PATENTS

| 343,571 | Great Britain | Feb. 23, 1931 |